United States Patent [19]

Radman et al.

[11] 4,419,704
[45] Dec. 6, 1983

[54] BERNOULLI PLATE FOR STABILIZATION OF FLEXIBLE MAGNETIC DISK

[75] Inventors: Anton J. Radman, Ogden; Randall C. Bauck, East Layton; Peter S. Kleczkowski, Ogden, all of Utah

[73] Assignee: Iomega Corporation, Ogden, Utah

[21] Appl. No.: 257,482

[22] Filed: Apr. 24, 1981

[51] Int. Cl.³ .......................... G11B 3/60; G11B 17/32
[52] U.S. Cl. ....................................... 360/102; 360/99
[58] Field of Search ................... 360/102, 103, 99, 97; 369/269–271, 263, 266

[56] References Cited

U.S. PATENT DOCUMENTS 3,900,893  8/1975  Hirose et al. ......................... 360/102
4,120,505  10/1978  Cox et al. ............................. 360/102
4,183,069  1/1980  Roullet et al. ....................... 360/102

Primary Examiner—Alfred H. Eddleman
Attorney, Agent, or Firm—Woodcock, Washburn, Kurtz, Mackiewicz & Norris

[57] ABSTRACT

An improved Bernoulli plate for juxtaposition to a rotating flexible magnetic disk so that the disk is rendered substantially rigid by a vacuum formed by the air between the plate and the disk being urged outwardly under the influence of centrifugal force is disclosed. The plate is formed by coining a metal substrate and thereafter electroplating the coined substrate so that any sharp irregularities resulting from the coining operation are smoothed, while the surface is provided with a hard, wear-resistant coating.

8 Claims, 2 Drawing Figures

BERNOULLI PLATE FOR STABILIZATION OF FLEXIBLE MAGNETIC DISK

FIELD OF THE INVENTION

This invention relates to the field of magnetic data storage disks. More particularly, the invention relates to an improved method of texturing a Bernoulli plate used to stabilize the operation of a rotating flexible magnetic disk.

BACKGROUND OF THE INVENTION

The course of development of magnetic data storage disk drives has proceeded in two generally divergent directions. A first line of development has been of rigid magnetic disks rotated in juxtaposition to magnetic read/write heads disposed very closely to the disk so that they "fly" on an air bearing in very close proximity to the disk. The close proximity allows high data densities, but the rigid disks are expensive and delicate to manufacture. A second line of development has been the so-called "floppy" disk in which a non-rigid disk is rotated, typically within an envelope. This sort of disk, not being rigid, cannot be rotated in close juxtaposition to such a flying head and accordingly data densities are lower.

It has previously been proposed to rotate a flopply disk in close proximity to a fixed, flat "Bernoulli" plate. The thin layer of air between the disk and the plate tends to rotate with the disk and to be thrown outwardly by centrifugal force. This creates a vacuum between plate and disk which tends to pull the disk close to the plate and cause it to behave in a substantially rigid manner. A flying head of the type described above as used in conjunction with rigid disks can then be used, providing the advantage of high data density but without the expense associated with rigid magnetic disks.

The prior art teaches that it is desirable to somehow texturize or break up the surface of the Bernoulli plates, so that the magnetic media will not cling to the surface, or "ring", as with a perfectly smooth plate. Several methods of texturing the surface have previously been disclosed, however, none have provided appropriate performance together with inexpensive processing of the plate. In particular, the texturing must proceed in such a manner that there are no projecting burrs or scratches on its surface. Since the disk is so close to the plate the height of the projections need not be substantial to severely damage the magnetic media.

OBJECTS OF THE INVENTION

It is accordingly an object of the invention to provide an inexpensive method of fabricating a Bernoulli plate.

It is a further object of the invention to provide a method of fabrication of a Bernoulli plate which is straight-forward of implementation yet reliable and repeatable in practice.

A further object of the invention is to provide an improved disk drive.

SUMMARY OF THE INVENTION

The above needs of the art and objects of the invention are satisfied by the present invention in which a Bernoulli plate is prepared by coining the surface of the disk at numerous locations by indenting it with a sharply pointed tool. The eruptions thus formed have sharp edges, which would tend to damage the magnetic media, if not eliminated. It is found by the present inventors that by electroplating the plate with, e.g., a hard chrome surface, the sharp edges of the eruptions are smoothed while the plate is provided with a hard, wear-resistant coating.

BRIEF DESCRIPTION OF THE DRAWINGS

The invention will be better understood if reference is made to the accompanying drawings, in which.

DESCRIPTION OF THE PREFERRED EMBODIMENTS

Figure 1:
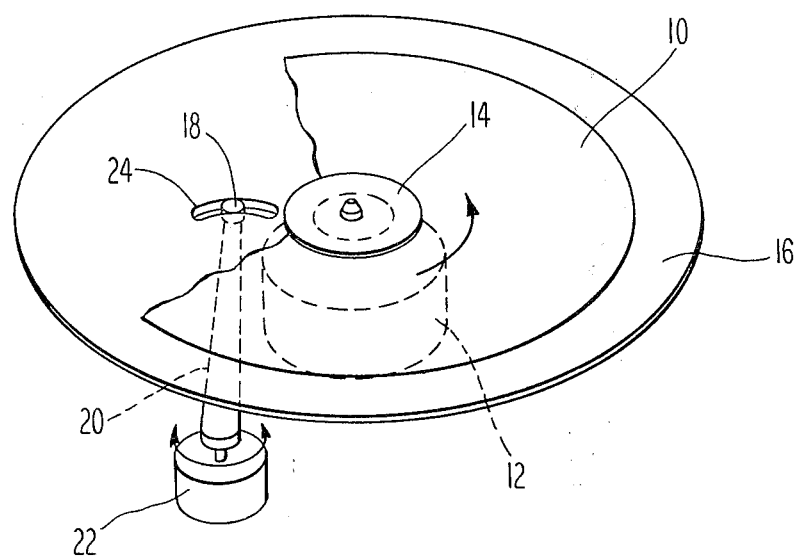
FIG. 1 shows the overall layout of a magnetic disk drive according to the invention.

FIG. 1 shows the basic elements of the disk drive according to the invention. A conventional magnetic floppy disk 10 is rotated by a motor 12 shown in phantom connected to the disk, typically by a magnetic hub 14. The disk 10 is rotated at constant speed, e.g., 1500 rpm, in juxtaposition to a Bernoulli plate 16. As noted above, the air between the floppy magnetic disk 10 and the Bernoulli plate 16 tends to rotate with the disk and accordingly be thrown outwardly by centrifugal force. This creates a vacuum between the disk 10 and the plate 16, which causes the floppy disk 10 to take on the characteristics of a rigid disk, allowing the use of a "flying" or "Winchester" read/write head closely juxtaposed to the disk surface, which allows high data densities to be achieved.

The read/write head 18 is shown positioned on the end of a servo arm 20 which rotates about the axis of a motor 22. A slot 24 is provided in the Bernoulli plate so that the read/write head 18 can access the various portions of the floppy disk 10 to which data is written and/or read.

As noted above, the surface of the Bernoulli plate 16 should be broken up so that the disk 10 does not tend to cling to it. The criticality of this surface poses constraints on the manufacture of the plate 16 and renders it more costly than it would otherwise be. In a particularly preferred embodiment of the invention, the plate 16 is accordingly provided as part of the magnetic disk drive, while the floppy disk 10 is provided within a cartridge which is adapted to be readily removed and replaced in the drive. The motor 12 is then moved into engagement with the disk 10. The details of these arrangements are discussed in co-pending application Ser. No. 256,320 filed Apr. 22, 1981.

Figure 2:
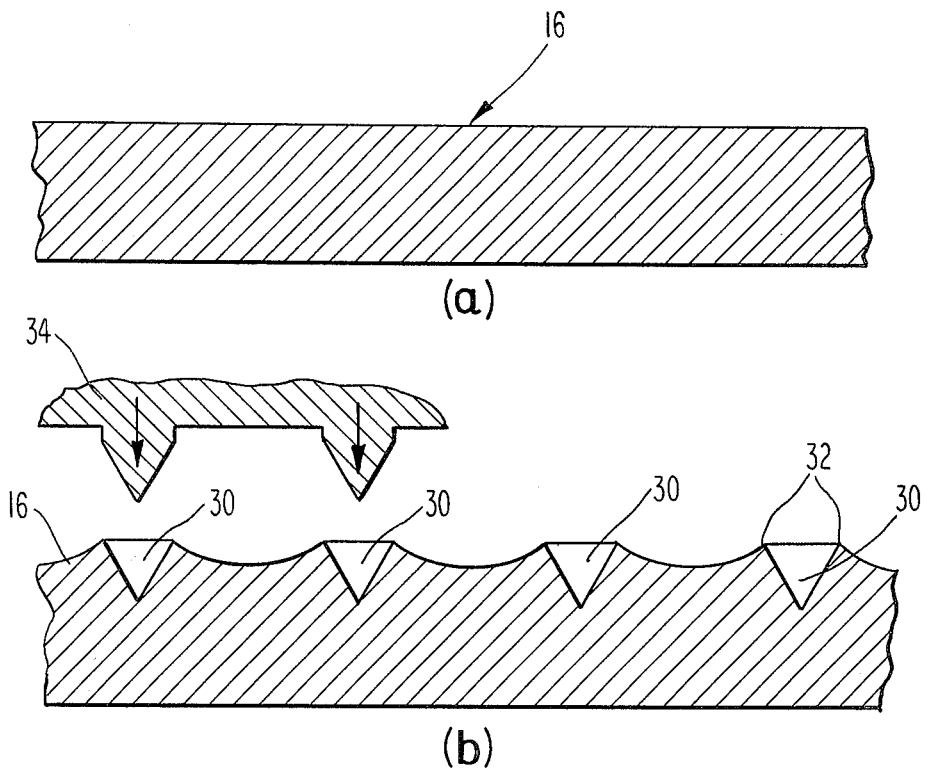
FIG. 2 shows three stages in the manufacture of the Bernoulli plate used in the device of FIG. 1.

FIG. 2 shows details of stages in the manufacture of the Bernoulli plate 16 of FIG. 1. FIG. 2(a) shows the planar virgin surface of the Bernoulli plate. This could be formed of any non-hardened metallic material; typically steel or aluminum would be used as these are relatively inexpensive. FIG. 2(b) shows the surface of the plate after the coining operation has been performed. In a particularly preferred embodiment, a sharply pointed die 34 is forced into engagement with the plate 16 by a high tonnage press forming dimples 30 surrounded by raised eruptions 32, in accordance with well-known principles of coining. Typically the density of the dimples is between about 50 and 250 per square inch; in a presently preferred embodiment their center-to-center spacing is approximately 0.100 inches. The dimples 30 are typically 0.005–0.010 inches deep, while the eruptions 32 are between 0.001–0.002 inches. The eruptions as coined have relatively sharp edges. If the typical flexible magnetic floppy disk is rotated in juxtaposition to these sharp peaks eventual damage to the surface of the disk is likely. Accordingly, the coined surface of FIG. 2(b) is not suitable for use as a Bernoulli plate in a floppy disk drive.

The present inventors have found that if a surface such as that shown in FIG. 2(b) is then electroplated with, e.g., chromium as shown in FIG. 2(c), the chrome layer 38 tends to smooth the sharp edges of eruptions 32, enabling the coining process to be used to form the plate. The use of chromium plating additionally provides a hard, wear-resistant surface to the disk 16 which is useful in increasing its service life. Tests have shown that the chrome surface does not damage the magnetic media, but it does prevent the media from clinging to the Bernoulli plate, thus achieving the objects of the invention referred to above.

It will be appreciated by those skilled in the art that the use of coining and electroplating steps in the formation of the Bernoulli plate is a particularly synergistic combination of method steps inasmuch as no metal is removed in either, as opposed to steps such as milling, grinding and the like. It will be appreciated by those skilled in the manufacturing arts that such metal removal steps are inevitably more costly than deformation steps such as coining such as required by the present invention. Moreover, it will be appreciated that the use of the plating method to smooth over the uplifted eruptions formed by the coining operation, rather than grinding, for example, additionally avoids metal removal operations in favor of the non-labor intensive, readily controlled electroplating operation, which is furthermore readily and reliably controllable. Other coating processes might also be of use.

Those skilled in the art will likewise recognize that there are numerous modifications and improvements that can be made to the present invention without departing from its essential scope which should, therefore, not be measured by the above exemplary disclosure, but only by the following claims.

We claim:

1. Method of manufacturing a Bernoulli plate for juxtaposition to a rotating magnetic disk so that said disk is stabilized, said method comprising the steps of:

providing a substantially flat, virgin plate consisting of a first relatively soft metal;

coining said plate at numerous locations with a sharply-pointed tool to form annular uplifted portions surrounding pits in said surface in a coining operation; and coating said coined plate with a layer of a second, relatively harder metal, whereby sharp edges, burrs and the like in said plate formed in said coining operation are smoothed.

2. The method of claim 1 wherein said first relatively soft material is selected from the group consisting of aluminum and steel.

3. The method of claim 1 wherein said second relatively harder metal is selected from the group consisting of chromium and its alloys.

4. A magnetic disk drive comprising a motor for rotating a flexible magnetic disk, a Bernoulli plate and a read/write head, said Bernoulli plate comprising:

a substrate of a first relatively soft metal having been coined at pluralities of locations so as to comprise pits having generally annular upraised portions therearound in said surface and a coating of a second relatively harder material, whereby burrs and sharp edges of said pits and upraised portions are smoothed and a wear-resistant surface is provided to said plate.

5. The apparatus of claim 1 wherein said substrate is formed of a metal selected from the group consisting of aluminum and steel and said coating material is selected from the group consisting of chromium and its alloys.

6. A Bernoulli plate for stabilization of a flexible disk rotated in juxtaposition thereto, comprising a substrate of a first relatively soft metal having been coined at pluralities of locations in order to comprise depressions surrounded by uplifted portions of said substrate in said surface and a coating of a second relatively harder material, whereby burrs and sharp edges of said uplifted portions are smoothed and a wear-resistant surface is provided to said plate.

7. The plate of claim 6 wherein said substrate is formed of a metal selected from the group consisting of aluminum and steel.

8. The plate of claim 6 wherein said coating is of a material selected from the group consisting of chromium and its alloys.

* * * * *